United States Patent Office 2,767,167
Patented Oct. 16, 1956

2,767,167

PROCESS OF REDUCING THE VISCOSITY OF GUMS

Joseph W. Opie, Robert Nordgren, and Robert M. Hamilton, Minneapolis, Minn., assignors to General Mills, Inc., a corporation of Delaware No Drawing. Application July 6, 1953,
Serial No. 366,396

9 Claims. (Cl. 260—209)

The present invention relates to a process for reducing the viscosity of mannan type gums. For some uses mannan gums are used to produce a high viscosity. In other uses the gums are employed for other properties, and high viscosities are disadvantageous. For these purposes it is desirable to be able to employ the mannan type gum in a given concentration without incurring excessive viscosities. It is toward this type of use that the present product is directed.

By the term "mannan type gums" as used herein is intended those polysaccharide gums which contain mannose units. These gums may contain only mannose units, but usually contain mannose units in combination with other sugar units such as galactose and glucose to form galactomannan and glucomannan gums respectively. Typical gums include guar, locust or carob bean, honey locust, ilesmannan, flame tree, tara, konjaku, palo verde and others.

It has now been discovered that it is possible to modify mannan type gums by treating them with an aqueous alcoholic solution of hydrogen peroxide such that the viscosity produced by the treated gum is materially less than that of the untreated gum.

It is, therefore, an object of the present invention to provide a process of modifyiing the viscosity characteristics of mannan type gums involving the treatment of the gum with an aqueous alcoholic solution of hydrogen peroxide.

The process may be applied to any of the above-mentioned gums in a variety of forms. They may be treated in their natural form as beans, grains or seeds, but in order to speed up the reaction the gum material is preferably reduced to a finely divided form. The particle size of the gum at the time of treatment is not critical, and any suitable particle size which will permit easy access of the aqueous alcoholic peroxide to the individual particles and easy draining of the solution from the particles, is suitable.

For the process any water-miscible alcohol may be used; preferably the lower aliphatic alcohols such as methyl, ethyl, isopropyl and tertiary butyl. These alcohols may be used in the form of aqueous solutions containing from 50-90% of alcohol by volume. Pereferably about 75% by volume is employed. The hydrogen peroxide may be introduced into the aqueous alcohol in any suitable manner, either as a concentrated hydrogen peroxide or as a dilute hydrogen peroxide. In any event, the quantity of water added with the peroxide should be taken into account in arriving at the concentrations of alcohol referred to above. In place of adding the hydrogen peroxide to the aqueous alcohol as such, the peroxide may be generated in the aqueous alcohol by the decomposition of other materials which liberate hydrogen peroxide. The quantity of the aqueous alcohol relative to the gum is not critical, but usually it is desirable to employ a substantially larger quantity of the aqueous alcohol than the gum. Some alkaline materials such as sodium carbonate or bicarbonate is desirably added to the aqueous alcohol for its effect upon the process. The alkaline material should be added in a quantity of from 0.5-1.0 equivalent based on the hydrogen peroxide.

The process is preferably carried out at an elevated temperature, and for this purpose it is usually desirable to employ the reflux temperature of the particular aqueous alcoholic solution. Generally this may fall within the range of about 65-100° C. The refluxing is usually carried on for from about 1-4 hours, after which the reaction mixture is neutralized, for example with acetic acid. The solution is then filtered and the recovered solid material is washed with methanol or acetone and is then air dried.

*Example 1*

To 100 ml. of an aqueous tertiary butanol solution (containing 75% tertiary butanol by volume) was added 50 g. of guar flour. The mixture was stirred and heated to the reflux temperature of the solvent (81° C.) and then sodium carbonate (0.4% based on guar) was added. Hydrogen peroxide (0.25% based on guar) in the form of a 10% aqueous solution was added. The mixture was refluxed for three hours and then brought to a pH of 7 with acetic acid. It was filtered, the solid filtered material was washed with tertiary butanol (75%) and then air-dried. A 1% sol prepared from this material had a viscosity of 191 cps. An untreated sample had a viscosity of 1300 cps.

*Example 2*

The conditions used in Example 2 are identical to those shown in Example 1 except that 0.8% sodium carbonate and 0.5% hydrogen peroxide were used. The viscosity of this product was 45 cps. The viscosity of the untreated product was 1300 cps.

*Example 3*

To 100 ml. of an aqueous solution of methanol (containing 75% methanol) was added 50 g. of guar flour. The mixture was stirred and heated to reflux temperature (71.5° C.). Sodium carbonate (0.3% based on guar) was added. Hydrogen peroxide in the form of a 10% solution (0.10% based on guar) was added. The solution was stirred and refluxed for four hours. It was then brought to a pH of 7 with acetic acid. It was filtered, the solid filtered material was washed with methanol and then air-dried. A 1% sol made up from this product had a viscosity of 607 cps. The viscosity of an untreated material was 1300 cps.

*Example 4*

The reaction conducted is identical to that shown in Example 3, except that refluxing was conducted for three hours and 1% sodium carbonate based on guar and 0.6% hydrogen peroxide based on guar were used. The viscosity of a 1% sol made from this product was 15.1 cps. The viscosity of an untreated product was 1300 cps.

We claim as our invention:

1. Process of reducing the viscosity of mannan gums which comprises treating the gum at a temperature within the approximate range of 65-100° C. with a solution of hydrogen peroxide in an aqueous solution of a water-miscible lower aliphatic alcohol, containing at least 50% alcohol by volume.

2. Process of lowering the viscosity of mannan gums which comprises refluxing the mannan gum with a solution of hydrogen peroxide in aqueous t-butanol, containing at least 50% alcohol by volume.

3. Process of lowering the viscosity of mannan gums which comprises refluxing the mannan gum with a solution of hydrogen peroxide in an aqueous solution of a water-miscible lower aliphatic alcohol, the aqueous solution containing from 50-90% of alcohol by volume.

4. Process of reducing the viscosity of mannan gums which comprises refluxing the mannan gum with a solution of hydrogen peroxide in aqueous tertiary butanol, the aqueous tertiary butanol containing from 50–90% of alcohol by volume.

5. Process of reducing the viscosity of mannan gums which comprises refluxing the mannan gum with a solution of hydrogen peroxide in aqueous tertiary butanol, the aqueous tertiary butanol containing 75% of alcohol by volume.

6. Process of reducing the viscosity of guar gum which comprises refluxing the guar gum with a solution of hydrogen peroxide in aqueous tertiary butanol, the aqueous tertiary butanol containing 75% of alcohol by volume.

7. Process of reducing the viscosity of mannan gums which comprises refluxing the mannan gum with a solution of hydrogen peroxide in aqueous methanol, the aqueous methanol containing from 50–90% of alcohol by volume.

8. Process of reducing the viscosity of mannan gums which comprises refluxing the mannan gum with a solution of hydrogen peroxide in aqueous methanol, the aqueous methanol containing 75% of alcohol by volume.

9. Process of reducing the viscosity of guar gum which comprises refluxing the guar gum with a solution of hydrogen peroxide in aqueous methanol, the aqueous methanol containing 75% of alcohol by volume.

References Cited in the file of this patent

UNITED STATES PATENTS 1,873,631    Pfister _____ Aug. 23, 1932